T. D. KELLY.
PROJECTION SCREEN OR THE LIKE.
APPLICATION FILED JULY 30, 1914.
1,262,511.
Patented Apr. 9, 1918.
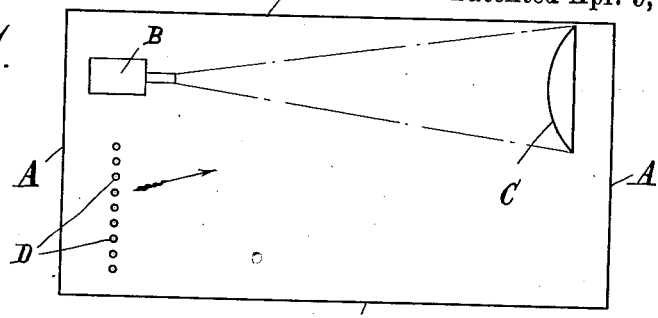
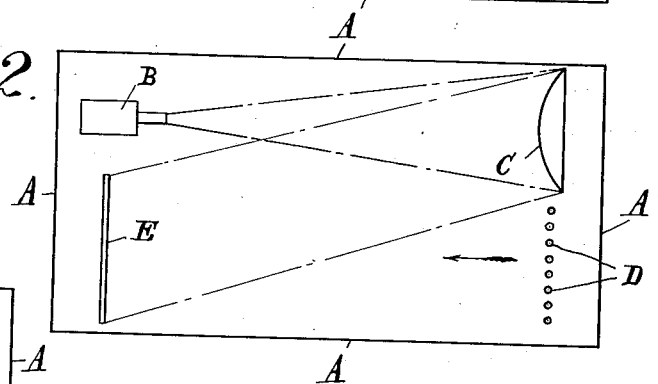
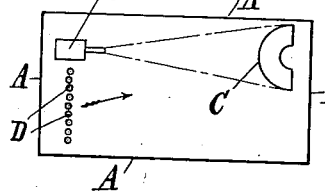
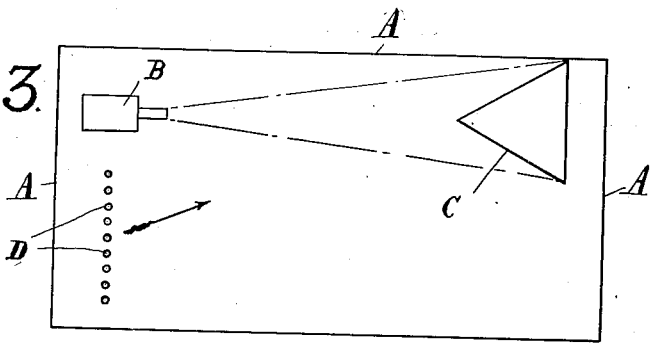
Witnesses:
M. E. McDade
C. S. Kesler
Inventor
Thomas D. Kelly
by
Amos L. Norris,
Attorney

UNITED STATES PATENT OFFICE.

THOMAS DANIEL KELLY, OF SOUTHEND-ON-SEA, ENGLAND.

PROJECTION-SCREEN OR THE LIKE.

1,262,511.  Specification of Letters Patent.  Patented Apr. 9, 1918.

Application filed July 30, 1914. Serial No. 854,148.

*To all whom it may concern:*

Be it known that I, THOMAS DANIEL KELLY, a subject of the King of Great Britain, residing at Southend-on-Sea, Essex, England, have invented certain new and useful Improvements in Projection-Screens or the like, of which the following is a specification.

This invention relates to a method of showing pictures in relief, and with a semi-solid appearance without having more than one projecting apparatus, two films, or mirrors to give two images, the screen on which the picture is projected being of such a shape that the center or one edge is nearer to the projecting apparatus than the top or sides.

I make my screen of opaque material, and I find that such a screen of convex, conical or pyramidal shape, or of a frustum of a cone, fulfils all the required conditions, and that, contrary to expectations, there is no distortion of the pictures which lie in relief in a plane across the apex of the opaque screen, even if the convexity is so much that it represents half a sphere.

For getting certain effects such as "pictures in the air", a picture receiving and displaying screen placed at any suitable angle can be used to show the pictures by reflection from the screen.

The annexed drawing represents in diagram several examples of how my invention can be carried into effect.

In all the figures it must be assumed that the room is in darkness.

Figure 1 is a plan of a room and appliance in which the pictures are projected onto a convex opaque screen.

Fig. 2 is a plan of a room and appliances in which the pictures are projected onto a convex opaque screen and from there reflected onto a reflective mirror from which the pictures are viewed by the audience.

Fig. 3 is a similar view to Fig. 1 but showing a conical opaque screen.

Fig. 4 is a similar view to Fig. 1 but showing the opaque screen as the frustum of a cone cut in half, but it may be a screen of a full frustum of a cone or of a pyramid.

A represent the walls of a darkened room.
B the projecting lantern.
C the opaque screen.
D the position of the audience, the arrow showing the direction in which they look.
E is a reflecting mirror.

It will be understood that in all cases the opaque screen is positioned with regard to the projecting lantern, and that its point is in the center or center line of the picture and from which the other parts of the opaque screen recede in regular lines.

When employing the reflective or transparent screen E, I have the effect of pictures in the air, and with regard to the viewing of the pictures from the opaque screen I get the effect of picture on a white cloud background.

I claim:—

1. A screen for projection apparatus having its picture receiving surface bulging outwardly toward the projector and gradually receding equally from an apex.

2. A screen for projection apparatus having its picture receiving surface bulging outwardly toward the projector, which surface gradually recedes equally from an apex, in combination with a reflector arranged to receive and display pictures in a darkened room from said screen by reflection.

3. In combination with a projecting lantern, a screen having its picture receiving surface bulging toward the lantern to form an apex, such surface receding gradually from the apex.

4. In projection apparatus, the combination of a projecting lantern, a screen having a picture receiving surface which bulges toward the projecting lantern, the peripheral portions of the picture receiving surface receding from the lantern, and a displaying reflector arranged to receive pictures reflected thereon by said screen.

In testimony whereof I have hereunto set my hand in presence of two subscribing witnesses.

THOMAS DANIEL KELLY.

Witnesses:
 WM. O. BROWN.
 FRED HUTCHINGS.